United States Patent
Zhang et al.

(10) Patent No.: US 9,735,828 B2
(45) Date of Patent: Aug. 15, 2017

(54) COMMUNICATION DEVICE AND METHOD FOR ANTENNA SELECTION

(71) Applicant: MediaTek Singapore Pte. Ltd., Singapore (SG)

(72) Inventors: Jianwei Zhang, Beijing (CN); Yanqi Wu, Beijing (CN); Wenze Qu, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/171,336

(22) Filed: Jun. 2, 2016

(65) Prior Publication Data

US 2017/0201289 A1 Jul. 13, 2017

(30) Foreign Application Priority Data

Jan. 11, 2016 (CN) .......................... 2016 1 0018651

(51) Int. Cl.
*H04B 1/06* (2006.01)
*H04B 7/02* (2017.01)
*H04B 1/44* (2006.01)
*H04W 72/04* (2009.01)
*H04W 72/08* (2009.01)

(52) U.S. Cl.
CPC .......... *H04B 1/44* (2013.01); *H04W 72/0446* (2013.01); *H04W 72/085* (2013.01)

(58) Field of Classification Search
CPC ... H04B 1/04; H04B 1/16; H04B 7/02; H04B 7/0404; H04B 7/06062; H04B 7/0608; H04B 7/082; H04B 7/0802; H04B 7/0805; H04B 7/0814; H04B 7/0825; H04B 17/309; H04B 17/318
USPC ...... 455/78, 110, 115.1, 115.3, 226.1, 226.2, 455/226.3, 272, 277.2, 101, 277.1
See application file for complete search history.

(56) References Cited

U.S. PATENT DOCUMENTS

| 5,634,204 A * | 5/1997 | Takahashi | H04B 7/0814 455/277.1 |
|---|---|---|---|
| 6,415,141 B1 * | 7/2002 | Kakura | H04B 7/0805 455/277.2 |
| 7,221,963 B2 * | 5/2007 | Ishihara | H04B 7/0874 455/277.1 |

(Continued)

*Primary Examiner* — Quochien B Vuong
(74) *Attorney, Agent, or Firm* — McClure, Qualey & Rodack, LLP

(57) ABSTRACT

The invention provides a communication device and a communication method. The communication device with at least a first antenna and a second antenna includes a switch element, a transceiver, and an antenna selection and control module. The switch element is coupled to the first antenna and the second antenna. The transceiver is coupled to the switch element. The antenna selection and control module controls the switch element to switch between the first antenna and the second antenna, such that the first antenna and the second antenna are respectively set as an operating antenna and a non-operating antenna. In one or more busy time periods of the operating antenna, the transceiver measures a first communication quality parameter of the operating antenna. In one or more idle time periods of the operating antenna, the transceiver measures a second communication quality parameter of the non-operating antenna.

18 Claims, 7 Drawing Sheets

(56) References Cited

U.S. PATENT DOCUMENTS

| | | | | |
|---|---|---|---|---|
| 7,447,482 B2* | 11/2008 | Hirata | ............... | H04B 7/0805 455/101 |
| 2013/0033996 A1* | 2/2013 | Song | ............... | H04B 7/0808 370/252 |
| 2015/0282196 A1* | 10/2015 | Kim | ............... | H04L 1/1893 370/252 |

* cited by examiner

COMMUNICATION DEVICE AND METHOD FOR ANTENNA SELECTION

CROSS REFERENCE TO RELATED APPLICATIONS

This Application claims priority of Chinese Patent Application No. 201610018651.2 filed on Jan. 11, 2016, the entirety of which is incorporated by reference herein.

BACKGROUND OF THE INVENTION

Field of the Invention

The disclosure generally relates to a communication device and a communication method, more specifically, to a communication device and an antenna selection method for improving the communication quality.

Description of the Related Art

With advancement in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

In order to enhance the communication quality of mobile devices, conventional designs often use multiple antennas and multiple corresponding transceiver units to form multiple communication paths, and this can solve the problem of a single communication path with poor signal quality. However, using multiple transceiver units inevitably results in a higher total manufacturing cost.

BRIEF SUMMARY OF THE INVENTION

Therefore, the invention provides at least a communication device and an antenna selection method.

In a preferred embodiment, the invention proposes a communication device with at least a first antenna and a second antenna. The communication device includes a switch element, a transceiver, and an antenna selection and control module. The switch element is coupled to the first antenna and the second antenna. The transceiver is coupled to the switch element. The antenna selection and control module is coupled to the switch element and the transceiver, and controls the switch element to switch between the first antenna and the second antenna. Accordingly, one of the first antenna and the second antenna which is switched to the transceiver is set as an operating antenna for receiving or transmitting signals, and the other of the first antenna and the second antenna which is not switched to the transceiver is set as a non-operating antenna. When the first antenna is set as the operating antenna, in one or more busy time periods of the operating antenna, the transceiver measures a first communication quality parameter of the first antenna set as the operating antenna, and in one or more idle time periods of the operating antenna, the antenna selection and control module controls the switch element to switch the transceiver to the non-operating antenna, such that the transceiver measures a second communication quality parameter of the second antenna set as the non-operating antenna.

In some embodiments, the antenna selection and control module compares the first communication quality parameter with the second communication quality parameter, and determines whether to update and swap the setting of the operating antenna and the non-operating antenna according to the comparison result.

In some embodiments, the antenna selection and control module uses a timer for counting a first time period.

In some embodiments, when the first time period is not expired, the antenna selection and control module continuously measures the first communication quality parameter and the second communication quality parameter. When the first time period is expired, the antenna selection and control module determines whether to update and swap the setting of the operating antenna and the non-operating antenna according to the measured first communication quality parameter and the measured second communication quality parameter.

In some embodiments, the duration of the first time period is adjusted according to the current operation state of the communication device or the current communication signal quality.

In some embodiments, during the first time period, at least one portion of the busy time periods of the operating antenna is forced to be set as the idle time period.

In some embodiments, the idle time periods include time periods configured by a network in which the operating antenna does not need to be used for receiving or transmitting signals. During the idle time periods, the communication device does not use the operating antenna for receiving or transmitting signals.

In some embodiments, in the busy time periods, the antenna selection and control module continuously samples one or more first sample parameters of the first communication quality parameter of the operating antenna, and in the idle time periods, the antenna selection and control module continuously samples one or more second sample parameters of the second communication quality parameter of the non-operating antenna. The first communication quality parameter includes an average value or a standard deviation value of the first sample parameters. The second communication quality parameter includes an average value or a standard deviation value of the second sample parameters.

In some embodiments, each of the first communication quality parameter and the second communication quality parameter includes one or more selected among RSRP (Reference Signal Received Power), RSRQ (Reference Signal Received Quality), transmission power, and path loss.

In some embodiments, if the second communication quality parameter is better than the first communication quality parameter, the antenna selection and control module updates and swaps the setting of the operating antenna and the non-operating antenna.

In a preferred embodiment, the invention proposes an antenna selection method applied to a communication device with at least a first antenna and a second antenna. A transceiver is shared by the first antenna and the second antenna. The antenna selection method includes the steps of: setting one of the first antenna and the second antenna which is switched to the transceiver as an operating antenna for receiving or transmitting signals, and setting the other of the first antenna and the second antenna which is not switched to the transceiver as a non-operating antenna; and when the first antenna is set as the operating antenna, in one or more busy time periods of the operating antenna, measuring a first communication quality parameter of the first antenna set as the operating antenna, and in one or more idle time periods of the operating antenna, switching the transceiver to the non-operating antenna, so as to measure a second communication quality parameter of the second antenna set as the non-operating antenna.

In some embodiments, the antenna selection method further includes: comparing the first communication quality parameter with the second communication quality parameter, and determining whether to update and swap the setting of the operating antenna and the non-operating antenna according to the comparison result.

In some embodiments, the antenna selection method further includes: using a timer for counting a first time period.

In some embodiments, the antenna selection method further includes: when the first time period is not expired, continuously measuring the first communication quality parameter and the second communication quality parameter; and when the first time period is expired, determining whether to update and swap the setting of the operating antenna and the non-operating antenna according to the measured first communication quality parameter and the measured second communication quality parameter.

In some embodiments, the antenna selection method further includes: adjusting the duration of the first time period according to the current operation state of the communication device or the current communication signal quality.

In some embodiments, the antenna selection method further includes: during the first time period, forcing at least one portion of the busy time periods of the operating antenna to be set as the idle time period.

In some embodiments, the idle time periods include time periods configured by a network in which the operating antenna does not need to be used for receiving or transmitting signals. During the idle time periods, the communication device does not use the operating antenna for receiving or transmitting signals.

In some embodiments, the antenna selection method further includes: in the busy time periods, continuously sampling one or more first sample parameters of the first communication quality parameter of the operating antenna; and in the idle time periods, continuously sampling one or more second sample parameters of the second communication quality parameter of the non-operating antenna. The first communication quality parameter includes an average value or a standard deviation value of the first sample parameters. The second communication quality parameter includes an average value or a standard deviation value of the second sample parameters.

In some embodiments, each of the first communication quality parameter and the second communication quality parameter includes one or more selected among RSRP (Reference Signal Received Power), RSRQ (Reference Signal Received Quality), transmission power, and path loss.

In some embodiments, the antenna selection method further includes: if the second communication quality parameter is better than the first communication quality parameter, updating and swapping the setting of the operating antenna and the non-operating antenna.

In another preferred embodiment, the invention proposes a communication device with at least a first antenna and a second antenna. The communication device includes a switch element, a transceiver, and an antenna selection and control module. The switch element is coupled to the first antenna and the second antenna. The transceiver is coupled to the switch element. The antenna selection and control module is coupled to the switch element and the transceiver, and controls the switch element to switch between the first antenna and the second antenna. Accordingly, one of the first antenna and the second antenna which is switched to the transceiver is set as an operating antenna for receiving or transmitting signals, and the other of the first antenna and the second antenna which is not switched to the transceiver is set as a non-operating antenna. When the first antenna is set as the operating antenna, in one or more idle time periods of the operating antenna, the antenna selection and control module controls the switch element to switch the transceiver from the operating antenna to the non-operating antenna, such that the transceiver measures a second communication quality parameter of the second antenna set as the non-operating antenna.

In some embodiments, the antenna selection and control module compares the second communication quality parameter with a threshold value. When the comparison result indicates that the second communication quality parameter is better than the threshold value, the antenna selection and control module updates and swaps the setting of the operating antenna and the non-operating antenna.

In some embodiments, the threshold value is a predetermined value. Alternatively, the threshold value is an experience value of a first communication quality parameter in one or more busy time periods of the first antenna used as the operating antenna.

In some embodiments, when the first antenna is set as the operating antenna, in the one or more busy time periods of the operating antenna, the transceiver measures the first communication quality parameter of the first antenna set as the operating antenna, and calculates and stores the experience value of the first communication quality parameter according to the measured first communication quality parameter.

In another preferred embodiment, the invention proposes an antenna selection method applied to a communication device with at least a first antenna and a second antenna. A transceiver is shared by the first antenna and the second antenna. The antenna selection method includes the steps of: setting one of the first antenna and the second antenna which is switched to the transceiver as an operating antenna for receiving or transmitting signals, and setting the other of the first antenna and the second antenna which is not switched to the transceiver as a non-operating antenna; and when the first antenna is set as the operating antenna, in one or more idle time periods of the operating antenna, switching the transceiver to the non-operating antenna, so as to measure a second communication quality parameter of the second antenna set as the non-operating antenna.

In some embodiments, the antenna selection method further includes: comparing the second communication quality parameter with a threshold value; and when the comparison result indicates that the second communication quality parameter is better than the threshold value, updating and swapping the setting of the operating antenna and the non-operating antenna.

In some embodiments, the threshold value is a predetermined value. Alternatively, the threshold value is an experience value of a first communication quality parameter in one or more busy time periods of the first antenna used as the operating antenna.

In some embodiments, the antenna selection method further includes: when the first antenna is set as the operating antenna, in the one or more busy time periods of the operating antenna, measuring the first communication quality parameter of the first antenna set as the operating antenna, and calculating and storing the experience value of the first communication quality parameter according to the measured first communication quality parameter.

The invention proposes an apparatus and a method for communication that can allow multiple antennas to share a single transceiver, thereby reducing the total manufacturing cost. Furthermore, such a design can guarantee the antenna diversity gain of the communication device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections. The following descriptions are better embodiments of the invention, and they are used to illustrate the main idea of the invention, rather than limitations of the patent scope. The true patent scope of the invention is determined by the following claims.

In order to illustrate the foregoing and other purposes, features and advantages of the invention, the embodiments and figures of the invention will be described in detail as follows.

Figure 1:
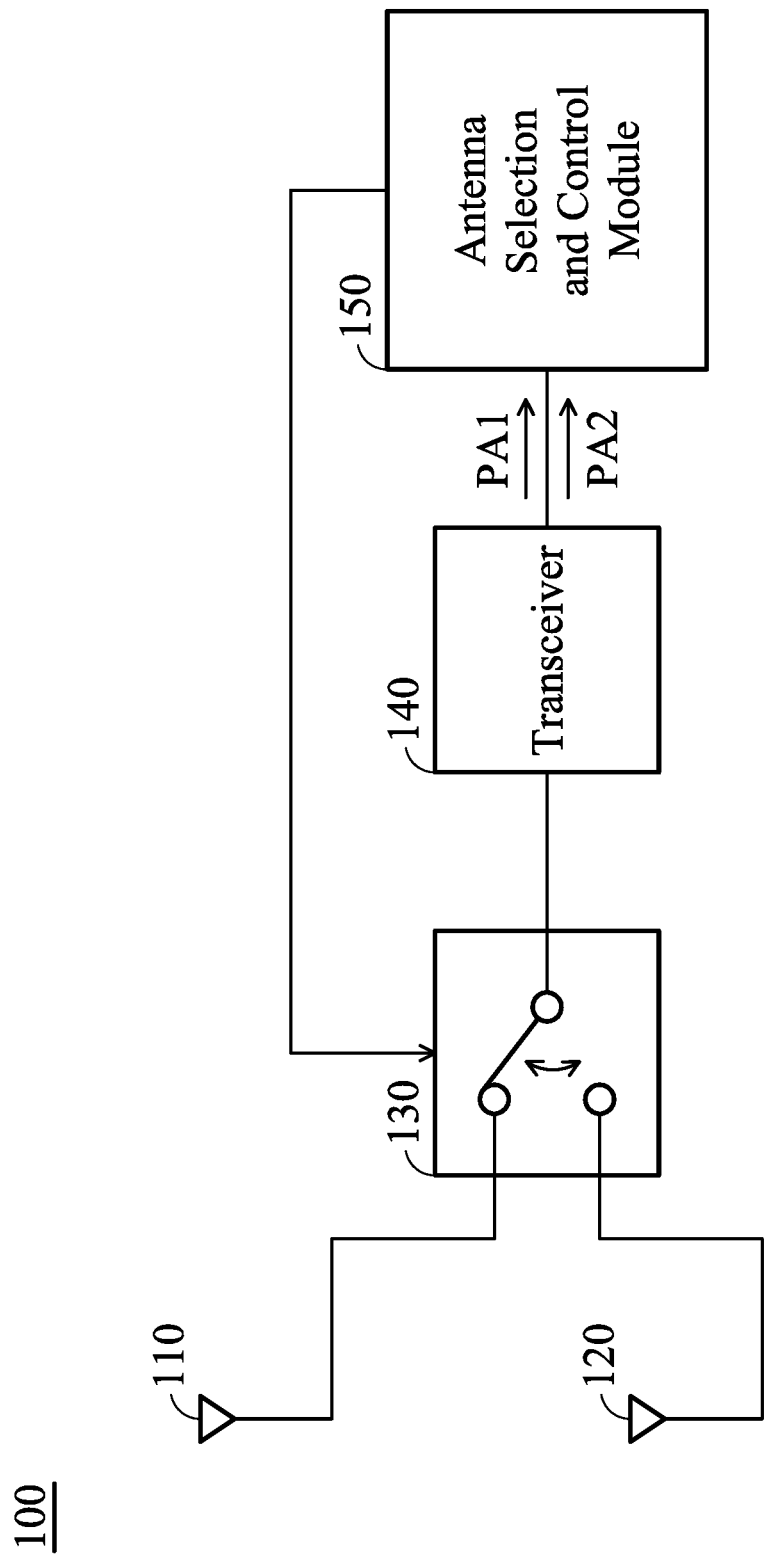
FIG. 1 is a diagram of a communication device according to an embodiment of the invention.

FIG. 1 is a diagram of a communication device 100 according to an embodiment of the invention. The communication device 100 may be a mobile communication device, such as a smartphone, a tablet computer, or a notebook computer. As shown in FIG. 1, the communication device 100 includes a first antenna 110, a second antenna 120, a switch element 130, a transceiver 140, and an antenna selection and control module 150. The first antenna 110 and the second antenna 120 can cover the same operation frequency band, such as a WLAN (Wireless Local Area Network) frequency band or an LTE (Long Term Evolution) frequency band. The first antenna 110 and the second antenna 120 may be the same or different types of antennas. For example, the first antenna 110 or the second antenna 120 may be a monopole antenna, a dipole antenna, a loop antenna, a patch antenna, a helical antenna, or a chip antenna, etc. It should be understood that the communication device 100 may further include other components, such as a processor, a speaker, a touch control panel, a battery, and a housing, although they are not displayed in FIG. 1. It is also noted that FIG. 1 shows that the communication device 100 merely includes the first antenna 110 and the second antenna 120, but the invention is not limited to the above. The communication device 100 may include more than two antennas.

Initially, one of the first antenna 110 and the second antenna 120 (i.e. the first antenna 110) is set as an operating antenna, and the other of the first antenna 110 and the second antenna 120 (i.e. the second antenna 120) is set as a non-operating antenna. The operating antenna is the antenna by which the transceiver 140 currently receives or transmits digital signals. For example, if the first antenna 110 is set as the operating antenna, the second antenna 120 should be set as the non-operating antenna; and conversely, if the first antenna 110 is set as the non-operating antenna, the second antenna 120 should be set as the operating antenna. The switch element 130 can switch between the operating antenna and the non-operating antenna. The transceiver 140 is coupled through the switch element 130 to the operating antenna or the non-operating antenna. In some embodiments, the switch element 130 is an SPDT (Single Port Double Throw) switch for switching to either the first antenna 110 or the second antenna 120. The antenna selection and control module 150 is coupled to the switch element 130 and the transceiver 140. The antenna selection and control module 150 controls the switch element 130 to switch between the first antenna 110 and the second antenna 120. If one of the first antenna 110 and the second antenna 120 is coupled to the transceiver 140, it will be set as the operating antenna, and the other (decoupled from the transceiver 140) of the first antenna 110 and the second antenna 120 will be set as the non-operating antenna. The above setting of the operating antenna and the non-operating antenna relative to the first antenna 110 and the second antenna 120 are adjustable, and it will be described in detail in the following embodiments.

Figure 2:
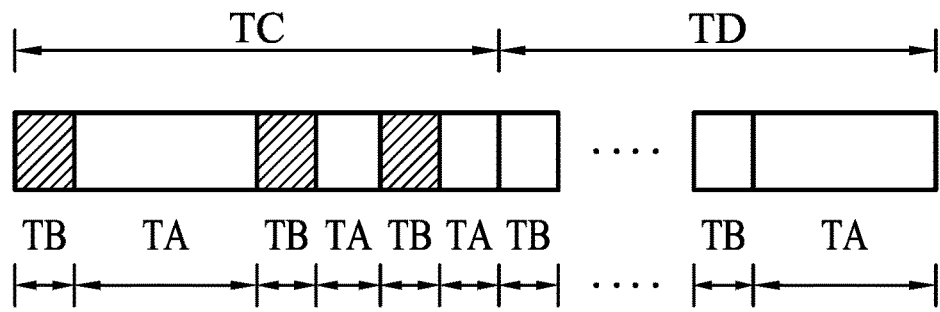
FIG. 2 is a diagram of a time period for antenna performance measurement according to an embodiment of the invention.

FIG. 2 is a diagram of a time period TC for antenna performance measurement according to an embodiment of the invention. In FIG. 2, the horizontal axis represents a time axis, and the right direction represents a positive direction of the time axis. The time period TC is the time interval for the communication device 100 to perform antenna performance measurement. The time period TD is the time interval for the communication device 100 not to perform antenna performance measurement. As shown in FIG. 2, each of the time period TC and the time period TD includes one or more busy time periods TA of the current operating antenna, and one or more idle time periods TB of the current operating antenna. According to an embodiment of the invention, the number and the duration of the busy time periods TA, and the number and the duration of the idle time periods TB are both adjustable. Specifically, during the idle time periods TB of the current operating antenna, the current operating antenna of the communication device 100 does not receive or transmit signals. For example, the idle time periods TB may be the time periods in which the current operating antenna does not receive or transmit signals, in which the current operating antenna does not perform a cell search, or in which the current operating antenna is forced to be disabled in response to the user setting or the communication device setting. Conversely, during the busy time periods TA of the current operating antenna, the current operating antenna of the communication device 100 can receive or transmit signals. According to an embodiment of the invention, the idle time periods TB of the current operating antenna include the time periods in which the network does not need to use the operating antenna for receiving or transmitting signals. According to another embodiment of the invention, the communication device 100 forces at least one portion of the busy time periods TA of the time period TC (such as the third TB block from left to right in FIG. 2) to be set as idle time period. For example, the communication device 100 may control the switch element 130, by using the antenna selection and control module 150, to switch between the first antenna 110 and the second antenna 120, such that at least one busy time period TA, or at least one portion of one busy time period TA of the plurality of busy time periods TA of the current operating antenna is set as an idle time period TB. According to an embodiment of the invention, the antenna performance measurement operation of the communication device 100 is as follows. As indicated by the time period TC for antenna performance measurement, in one or more busy time periods TA, the antenna selection and control module 150 controls the switch element 130 to switch to the first antenna 110 in FIG. 1 set as the operating antenna, such that the transceiver 140 measures a first communication quality parameter PA1 relative to the operating antenna. In at least one of the one or more idle time periods TB (e.g., the idle time periods TB indicated by the slash regions of FIG. 2), the switch element 130 switches to the second antenna 120 in FIG. 1 set as the non-operating antenna, such that the antenna selection and control module 150 measures a second communication quality parameter PA2 relative to the non-operating antenna. The first communication quality parameter PA1 represents the quality of communication signal when the transceiver 140 is coupled to one antenna used as the operating antenna. The second communication quality parameter PA2 represents the quality of communication signal when the transceiver 140 is coupled to another antenna used as the non-operating antenna. Then, the antenna selection and control module 150 compares the first communication quality parameter PA1 with the second communication quality parameter PA2, so as to determine whether to update and swap the setting of the operating antenna and the non-operating antenna.

Figure 3:
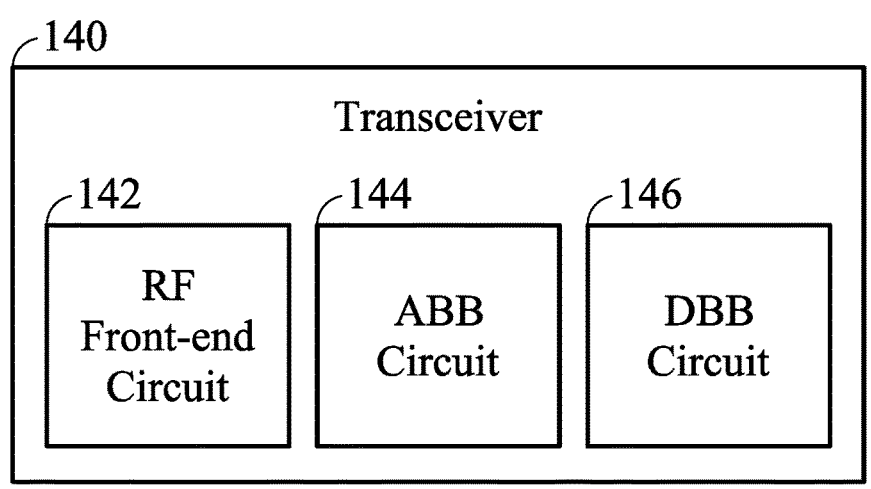
FIG. 3 is a diagram of a transceiver according to an embodiment of the invention.

FIG. 3 is a diagram of the transceiver 140 according to an embodiment of the invention. In the embodiment of FIG. 3, the transceiver 140 includes an RF (Radio Frequency) front-end circuit 142, an ABB (Analog Baseband) circuit 144, and a DBB (Digital Baseband) circuit 146. It should be noted that the structure of the transceiver 140 of FIG. 3 is just exemplary, but the invention is not limited thereto. According to other embodiments of the invention, the transceiver 140 may include circuits other than the RF front-end circuit 142, the ABB circuit 144, and the DBB circuit 146. The transceiver 140 is configured to process signals received from or transmitted to the first antenna 110 and the second antenna 120, analyze these signals, and generate the aforementioned first communication quality parameter PA1 for the first antenna 110 set as the operating antenna and second communication quality parameter PA2 for the second antenna 120 set as the operating antenna. For example, the first communication quality parameter PA1 and the second communication quality parameter PA2 may include RSRP (Reference Signal Received Power), RSRQ (Reference Signal Received Quality), transmission power, and/or path loss. It is noted that according to a plurality of embodiments of the invention, the reference signal includes a plurality of embodiments. In some embodiments, the reference signal is a pilot signal of a 3G communication system (e.g., a 3G TDD (Time-Division Duplex) communication system or a 3G FDD (Frequency-Division Duplex) communication system). In some embodiments, the reference signal is an RS (Reference signal) of a 4G communication system. The invention is not limited to the above.

Figure 4:
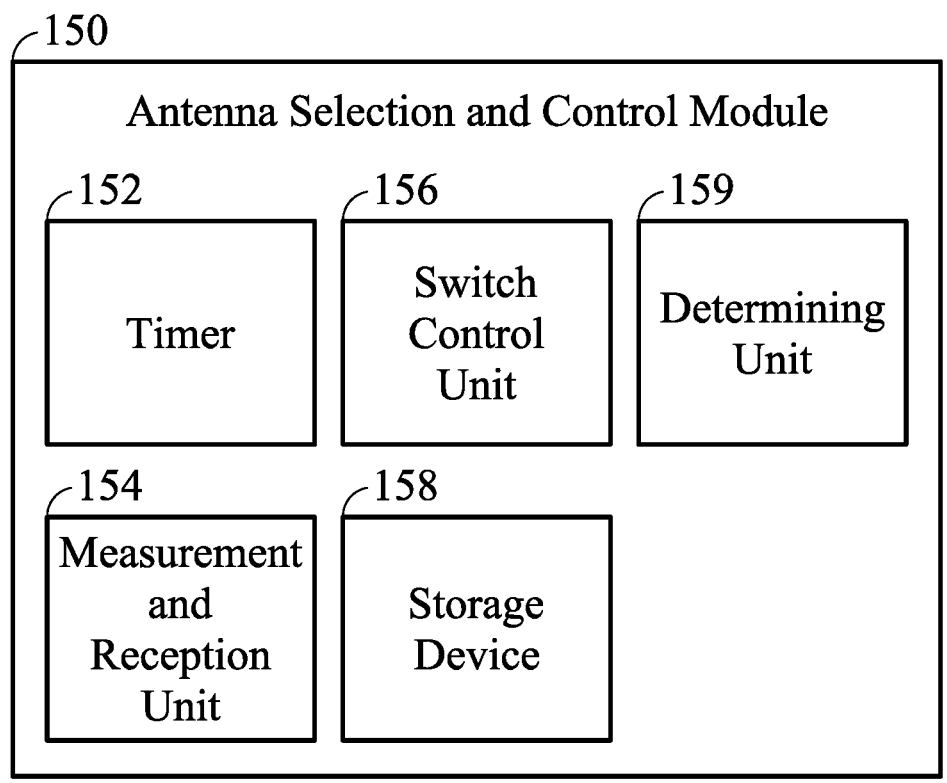
FIG. 4 is a diagram of an antenna selection and control module according to an embodiment of the invention.

FIG. 4 is a diagram of the antenna selection and control module 150 according to an embodiment of the invention. In the embodiment of FIG. 4, the antenna selection and control module 150 includes a timer 152, a measurement and reception unit 154, a switch control unit 156, a storage device 158, and a determining unit 159. According to an embodiment of the invention, the storage device 158 is disposed outside the antenna selection and control module 150, and is coupled to the antenna selection and control module 150. The aforementioned sub-elements of the antenna selection and control module 150 may be implemented with a variety of logic circuits. The timer 152 is configured to count the aforementioned time period TC. The measurement and reception unit 154 is configured to receive the first communication quality parameter PA1 and the second communication quality parameter PA2 from the transceiver 140. The switch control unit 156 is configured to control the switching state of the switch element 130. The storage device 158 is configured to store one or more sample signals, the first communication quality parameter PA1, and the second communication quality parameter PA2. The determining unit 159 is configured to determine whether to update and swap the setting of the operating antenna and the non-operating antenna according to the data stored in the storage device 158. According to an embodiment of the invention, the antenna selection and control module 150 includes the timer 152, the measurement and reception unit 154, the switch control unit 156, and the determining unit 159 is implemented with a processor, which executes corresponding commands to perform corresponding functions. However, the invention is not limited to the above. One of ordinary skill in the art can understand the above functions can be implemented with any combination of hardware components, software components, or firmware components.

Figure 5:
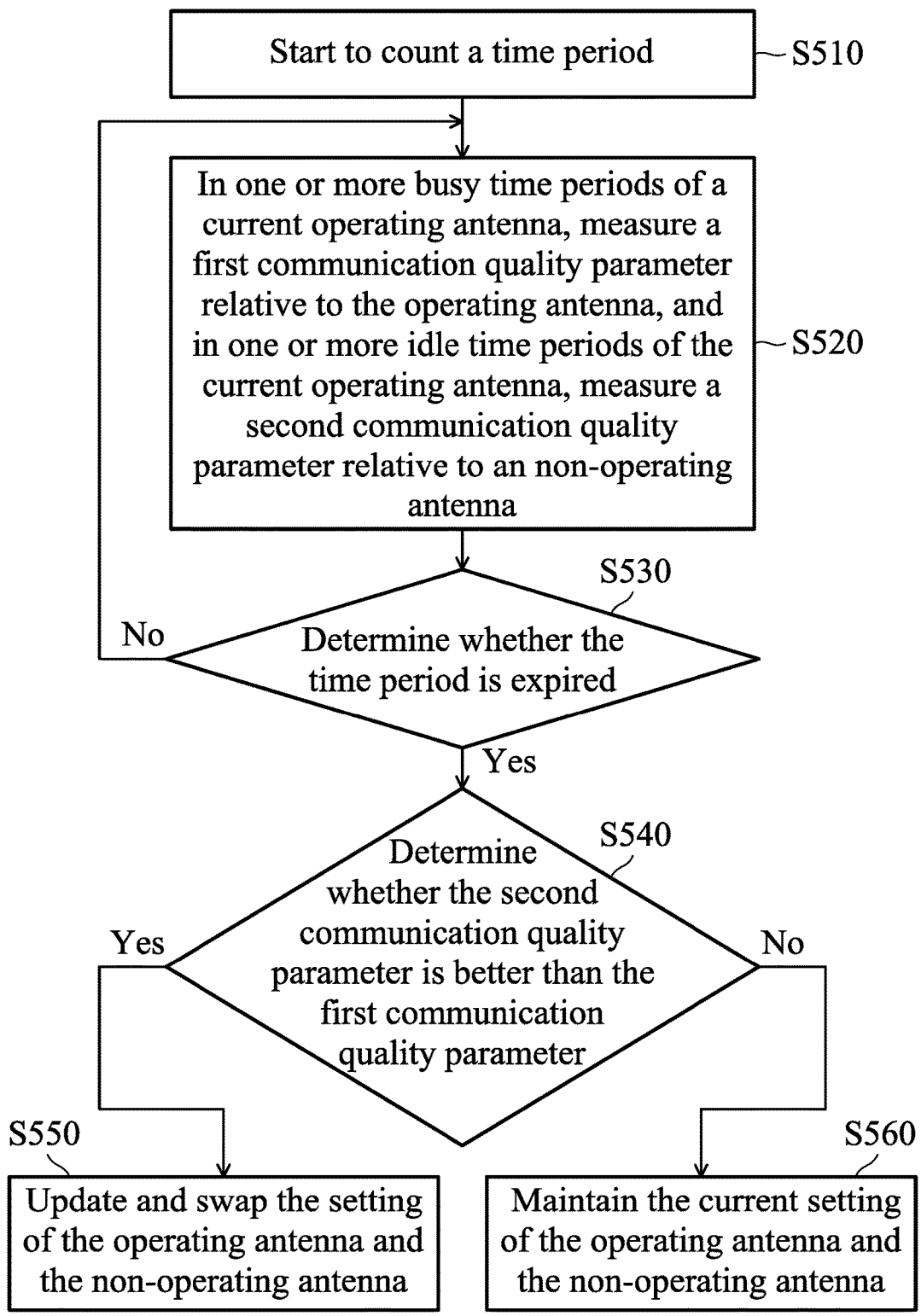
FIG. 5 is a flowchart of operations of a communication device according to an embodiment of the invention.

FIG. 5 is a flowchart of operations of the communication device 100 according to an embodiment of the invention. Please refer to FIGS. 1 to 5 together. The timer 152 of the antenna selection and control module 150 can count a time period TC periodically. In each periodic cycle of the time period TC, the communication device 100 and the antenna selection and control module 150 therein can operate according to the flowchart of FIG. 5. First, in step S510, the timer 152 of the antenna selection and control module 150 is triggered, and starts to count the time period TC. Then, in step S520, the switch control unit 156 of the antenna selection and control module 150 controls the switch element 130 to switch to the operating antenna or the non-operating antenna. Accordingly, the measurement and reception unit 154 of the antenna selection and control module 150 measures the first communication quality parameter PA1 relative to the operating antenna (i.e. the first antenna 110 as shown in FIG. 1) in one or more busy time periods TA of the current operating antenna, and measures the second communication quality parameter PA2 relative to the non-operating antenna (i.e. the second antenna 120 as shown in FIG. 1) in one or more idle time periods TB of the current operating antenna. For example, during the busy time periods TA, the measurement and reception unit 154 of the antenna selection and control module 150 may continuously sample one or more first sample parameters relative to the operating antenna; and during the idle time periods TB, the measurement and reception unit 154 of the antenna selection and control module 150 may continuously sample one or more second sample parameters relative to the non-operating antenna. The aforementioned first sample parameters and the second sample parameters may include RSRP (Reference Signal Received Power), RSRQ (Reference Signal Received Quality), transmission power, and/or path loss. In some embodiments, the first communication quality parameter PA1 includes an average value or a standard deviation value of the first sample parameters, and the second communication quality parameter PA2 includes an average value or a standard deviation value of the second sample parameters. The above first sample parameters, second sample parameters, first communication quality parameter PA1, and second communication quality parameter PA2 may be stored in the storage device 158 of the antenna selection and control module 150, and then be further analyzed by the determining unit 159 of the antenna selection and control module 150.

Next, in step S530, the timer 152 of the antenna selection and control module 150 determines whether the time period TC is expired. When the time period TC is not expired, the procedure goes back to step S520, and the measurement and reception unit 154 of the antenna selection and control module 150 continuously measures the first communication quality parameter PA1 and the second communication quality parameter PA2. When the time period TC is expired, in step S540, the determining unit 159 of the antenna selection and control module 150 determines whether to update and swap the setting of the operating antenna and the non-operating antenna according to the first communication quality parameter PA1 and the second communication quality parameter PA2. If the second communication quality parameter PA2 is better than the first communication quality parameter PA1, in step S550, the determining unit 159 of the antenna selection and control module 150 will update and swap the setting of the operating antenna and the non-operating antenna. If the second communication quality parameter PA2 is not better than the first communication quality parameter PA1, in step S560, the determining unit 159 of the antenna selection and control module 150 will maintain the current setting of the operating antenna and the non-operating antenna. For example, it may be assumed that the first antenna 110 is the current operating antenna, and the second antenna 120 is the current non-operating antenna. The determining unit 159 of the antenna selection and control module 150 compares the first communication quality parameter PA1 of the first antenna 110 with the second communication quality parameter PA2 of the second antenna 120 in step S540. If the first communication quality parameter PA1 is better, the determining unit 159 of the antenna selection and control module 150 will maintain the setting by which the first antenna 110 is used as the operating antenna and the second antenna 120 is used as the non-operating antenna. Conversely, if the second communication quality parameter PA2 is better, the determining unit 159 of the antenna selection and control module 150 will reset the second antenna 120 as the operating antenna and reset the first antenna 110 as the non-operating antenna (i.e., swap the setting of the operating antenna and the non-operating antenna), so as to improve the communication quality. If the first antenna 110 is the current non-operating antenna and the second antenna 120 is the current operating antenna, they can operate similarly according to the above operation principles.

In alternative embodiments, in step S540, the determining unit 159 of the antenna selection and control module 150 compares the second communication quality parameter PA2 with a threshold value. The threshold value may be predetermined, e.g., preset by the user. For example, the threshold value may include a fixed reference value of RSRP (Reference Signal Received Power), RSRQ (Reference Signal Received Quality), transmission power, and/or path loss. If the second communication quality parameter PA2 for the second antenna 120 set as the non-operating antenna is better than the threshold value, the determining unit 159 of the antenna selection and control module 150 will update and swap the setting of the operating antenna and the non-operating antenna (as step S550). Conversely, if the second communication quality parameter PA2 is not better than the threshold value, the determining unit 159 of the antenna selection and control module 150 will maintain the current setting of the operating antenna and the non-operating antenna (as step S560).

Figure 6:
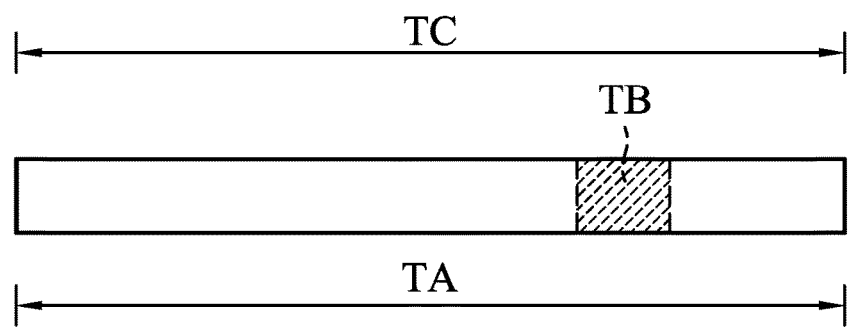
FIG. 6 is a diagram of a time period for antenna performance measurement according to another embodiment of the invention.

FIG. 6 is a diagram of a time period TC for antenna performance measurement according to another embodiment of the invention. If the communication device 100 is too busy, the time period TC may include only busy time periods TA, and the antenna selection and control module 150 may force at least one portion of the busy time periods TA (e.g., at least one of the plurality of busy time periods TA, and/or at least one portion of any single busy time period TA) to be set as an idle time period TB. As a result, the second communication quality parameter PA2 relative to the non-operating antenna can be measured.

In some embodiments, the antenna selection and control module 150 adjusts the duration of the time period TC according to the current communication signal quality (i.e., the communication signal quality of the current operating antenna). For example, the current communication signal quality may include an SNR (Signal-to-Noise Ratio) of the communication device 100. If the SNR increases, it may represent good current communication quality, and the antenna performance measurement may be performed at a lower frequency. Thus, the duration of the time period TD (not to perform the antenna performance measurement) of FIG. 2 is increased, so as to slow down the selection procedure of the operating antenna and the non-operating antenna. If the SNR decreases, it may represent poor current communication quality, and the antenna performance measurement may be performed at a higher frequency. Thus, the duration of the time period TD (not to perform the antenna performance measurement) of FIG. 2 is decreased, so as to speed up the selection or resetting procedure of the operating antenna and the non-operating antenna. According to an embodiment of the invention, the current communication signal quality of the communication device 100 may be an average communication signal quality over a predetermined time interval, but the invention is not limited thereto.

In some embodiments, the antenna selection and control module 150 adjusts the duration of the time period TC according to the operation state of the communication device 100. For example, if the duration of the idle operation of the communication device 100 is relative long (e.g., the duration of the idle operation is longer than a threshold value), it may mean that the communication device 100 need not perform data communication with the network for a long time period, and the antenna performance measurement may be performed at a lower frequency. Thus, the duration of the time period TD (not to perform the antenna performance measurement) of FIG. 2 is increased, so as to slow down the selection procedure of the operating antenna and the non-operating antenna. If the duration of the idle operation of the communication device 100 is relative short (e.g., the duration of the idle operation is shorter than a threshold value), it may mean that the communication device 100 needs to perform data communication with the network, and the antenna performance measurement may be performed at a higher frequency, in comparison to the communication device 100 operating in an idle state. Thus, the duration of the time period TD (not to perform the antenna performance measurement) of FIG. 2 is decreased, so as to speed up the performance monitor procedure (antenna performance measurement) of the operating antenna and the non-operating antenna, and avoid poor quality of communication signal of the communication device 100 due to poor performance of the current operating antenna. If the duration of the busy operation of the communication device 100 is too long (e.g., the duration of the busy operation is longer than a threshold value), and/or if the duration of the idle operation of the communication device 100 is too short to measure the non-operating antenna, according to another embodiment of the invention, the communication device 100 will force at least one portion of the busy time periods TA of the time period TC (e.g., at least one of the plurality of busy time periods TA, and/or at least one portion of any single busy time period TA) to be set as an idle time period TB for measuring the non-operating antenna.

Figure 7:
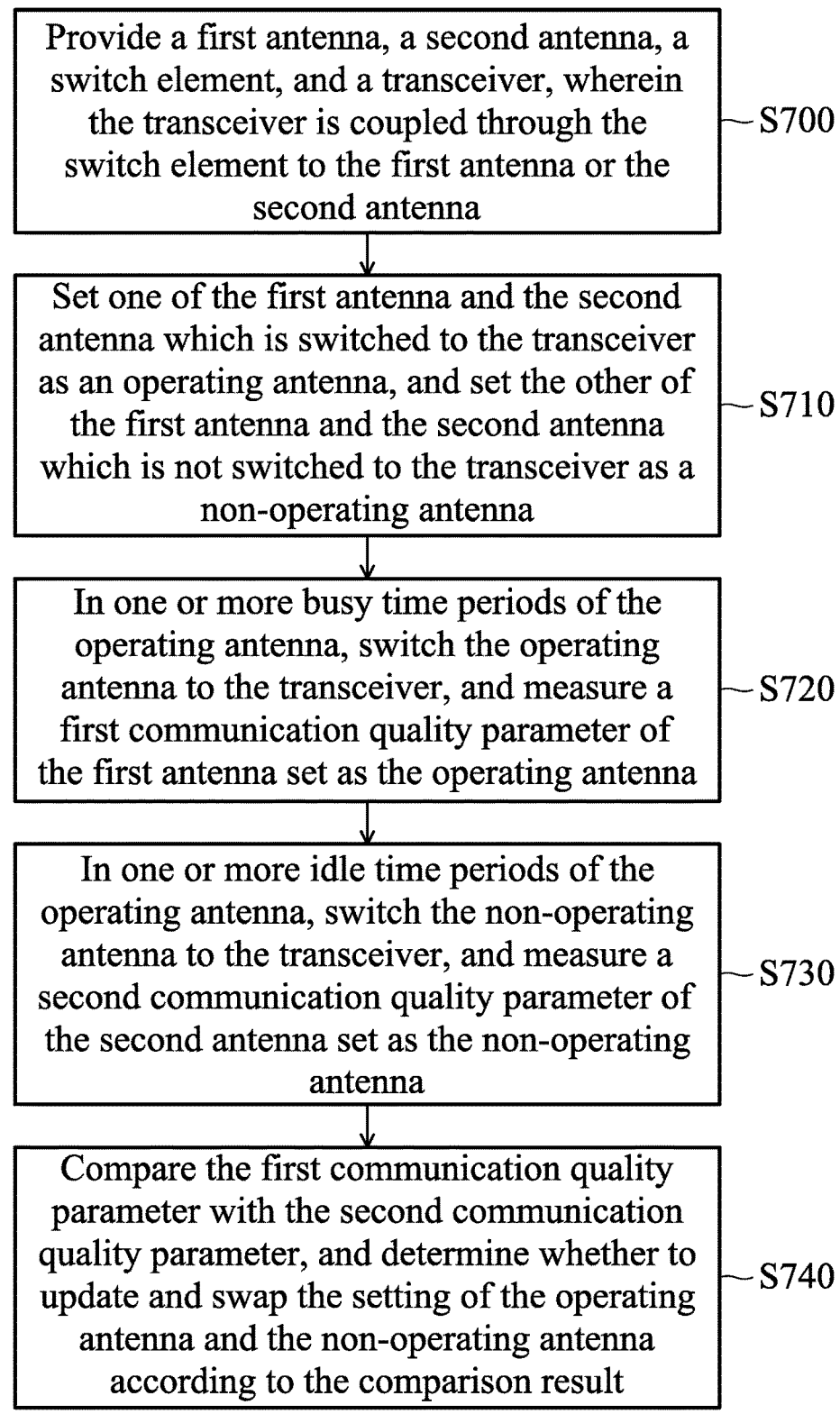
FIG. 7 is flowchart of a method for antenna selection according to an embodiment of the invention.

FIG. 7 is flowchart of a method for antenna selection according to an embodiment of the invention. In step S700, a first antenna, a second antenna, a switch element, and a transceiver are provided. The transceiver is coupled through the switch element to the first antenna or the second antenna. In step S710, one of the first antenna and the second antenna, which is switched to the transceiver, is set as an operating antenna, and the other of the first antenna and the second antenna, which is not switched to the transceiver, is set as a non-operating antenna. In step S720, in one or more busy time periods of the operating antenna, the operating antenna is switched to the transceiver, and a first communication quality parameter of the first antenna set as the operating antenna is measured. In step S730, in one or more idle time periods of the operating antenna, the non-operating antenna is switched to the transceiver, and a second communication quality parameter of the second antenna set as the non-operating antenna is measured. In step S740, the first communication quality parameter is compared with the second communication quality parameter, and whether to update and swap the setting of the operating antenna and the non-operating antenna is determined according to the comparison result. It should be noted that the above steps may not be required to be performed in order, and all of the features of the embodiments of FIGS. 1 to 6 may be applied to the communication method of FIG. 7.

Figure 8:
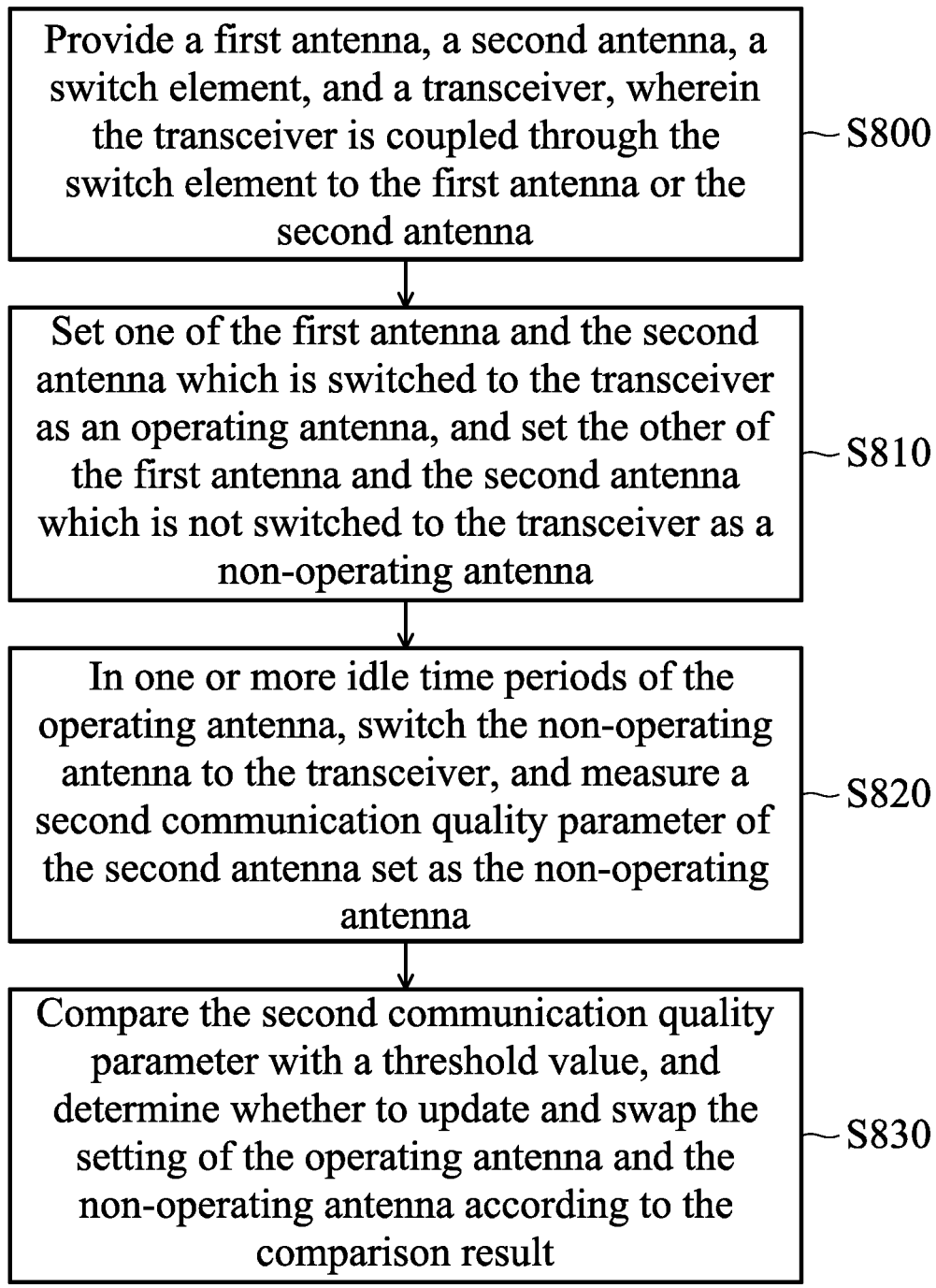
FIG. 8 is flowchart of a method for antenna selection according to another embodiment of the invention.

FIG. 8 is flowchart of a method for antenna selection according to another embodiment of the invention. In the following embodiment, the method is integrated with the communication device 100 as shown in FIG. 1. As shown in FIG. 8, in step S800, a first antenna 110, a second antenna 120, a switch element 130, and a transceiver 140 are provided. The transceiver 140 is coupled through the switch element 130 to the first antenna 110 or the second antenna 120. In step S810, one of the first antenna 110 and the second antenna 120, which is switched to the transceiver 140, is set as an operating antenna (e.g., the first antenna 110) for signal reception or transmission, and the other of the first antenna 110 and the second antenna 120, which is not switched to the transceiver 140, is set as a non-operating antenna (e.g., the second antenna 120). In step S820, in one or more idle time periods of the operating antenna, the antenna selection and control module 150 controls the switch element 130 to switch the non-operating antenna to the transceiver 140, and the transceiver 140 measures a second communication quality parameter PA2 of the second antenna 120 set as the non-operating antenna. In step 830, the antenna selection and control module 150 compares the second communication quality parameter PA2 with a threshold value, so as to determine whether to update and swap the setting of the operating antenna and the non-operating antenna according to the comparison result. According to an embodiment of the invention, when the comparison result indicates that the second communication quality parameter PA2 of the non-operating antenna (i.e., the second antenna 120) is better than the threshold value, the antenna selection and control module 150 updates and swaps the setting of the operating antenna and the non-operating antenna.

In some embodiments, the aforementioned threshold value is a predetermined value. In alternative embodiments, the aforementioned threshold value is an experience value of the first communication quality parameter PA1 in one or more busy time periods of the first antenna used as the operating antenna. In some embodiments, when the first antenna 110 is set as the operating antenna, in one or more busy time periods of the operating antenna, the transceiver 140 measures the first communication quality parameter PA1 of the first antenna 110 set as the operating antenna, and calculates and stores the experience value of the first communication quality parameter PA1 according to the measured first communication quality parameter PM. For example, the experience value may be an average value of the measured first communication quality parameter PA1 during a predetermined time period, but it is not limited thereto. The invention proposes a novel communication device and a novel antenna selection method. In summary, the invention measures the performance parameters of an operating antenna during busy time periods, measures the performance parameters of a non-operating antenna during idle time periods, and then accordingly determines whether to update and swap the setting of the operating antenna and the non-operating antenna. In comparison with the conventional design, the communication device and method of the invention need only one transceiver shared by the operating antenna and the non-operating antenna, and therefore the manufacturing cost is reduced. Furthermore, the invention can enhance the antenna diversity gain of the communication device with a lower manufacturing cost, and it is suitable for application in a variety of mobile communication devices.

Note that the above element parameters are not limitations of the invention. A designer can fine-tune these settings or values according to different requirements. It should be understood that the communication device and method of the invention are not limited to the configurations of FIGS. 1-7. The invention may merely include any one or more features of any one or more embodiments of FIGS. 1-7. In other words, not all of the features displayed in the figures should be implemented in the communication device and method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device with at least a first antenna and a second antenna, comprising:
    a switch element, coupled to the first antenna and the second antenna;
    a transceiver, coupled to the switch element; and
    an antenna selection and control module, coupled to the switch element and the transceiver, and controlling the switch element to switch between the first antenna and the second antenna, wherein one of the first antenna and the second antenna is set as an operating antenna for receiving or transmitting signals to or from a network, and the other of the first antenna and the second antenna is set as a non-operating antenna;
    wherein when the first antenna is set as the operating antenna, in one or more first time periods of the operating antenna, the transceiver measures a first communication quality parameter of the first antenna set as the operating antenna, and in one or more second time periods of the operating antenna, the antenna selection and control module controls the switch element to switch to the non-operating antenna, and the transceiver measures a second communication quality parameter of the second antenna set as the non-operating antenna;
    wherein the first time periods are busy time periods, and the second time periods are idle time periods;
    wherein the idle time periods include time periods configured by the network during which the operating antenna does not need to be used for receiving or transmitting signals.

2. The communication device as claimed in claim 1, wherein the antenna selection and control module uses a timer for counting a third time period, wherein when the third time period is not expired, the antenna selection and control module continuously measures the first communication quality parameter and the second communication quality parameter, and wherein when the third time period is expired, the antenna selection and control module determines whether to update and swap a setting of the operating antenna and the non-operating antenna according to the measured first communication quality parameter and the measured second communication quality parameter.

3. The communication device as claimed in claim 2, wherein duration of the third time period is adjusted according to an operation state of the communication device or current communication signal quality.

4. The communication device as claimed in claim 2, wherein during the third time period, the antenna selection and control module forces the operating antenna to be set as idle during at least one portion of the first time periods.

5. The communication device as claimed in claim 1, wherein the second time periods include time periods configured by a network in which the operating antenna does not need to be used for receiving or transmitting signals.

6. The communication device as claimed in claim 1, wherein the antenna selection and control module compares the first communication quality parameter with the second communication quality parameter, and determines whether to update and swap a setting of the operating antenna and the non-operating antenna according to a comparison result.

7. The communication device as claimed in claim 6, wherein if the second communication quality parameter is better than the first communication quality parameter, the antenna selection and control module updates and swaps the setting of the operating antenna and the non-operating antenna.

8. The communication device as claimed in claim 1, wherein in the first time periods, the antenna selection and control module samples one or more first sample parameters of the first communication quality parameter of the operating antenna, wherein in the second time periods, the antenna selection and control module samples one or more second sample parameters of the second communication quality parameter of the non-operating antenna, and wherein the first communication quality parameter comprises an average value or a standard deviation value of the first sample parameters, and the second communication quality parameter comprises an average value or a standard deviation value of the second sample parameters.

9. The communication device as claimed in claim 1, wherein each of the first communication quality parameter and the second communication quality parameter comprises one or more selected among RSRP (Reference Signal Received Power), RSRQ (Reference Signal Received Quality), transmission power, and path loss.

10. An antenna selection method applied to a communication device with at least a first antenna and a second antenna, a transceiver being shared by the first antenna and the second antenna, and the antenna selection method comprising the steps of:
    setting one of the first antenna and the second antenna as an operating antenna for receiving or transmitting signals to or from a network, and setting the other of the first antenna and the second antenna as a non-operating antenna; and
    when the first antenna is set as the operating antenna, in one or more first time periods of the operating antenna, measuring a first communication quality parameter of the first antenna set as the operating antenna, and in one or more second time periods of the operating antenna, switching the transceiver to the non-operating antenna, and measuring a second communication quality parameter of the second antenna set as the non-operating antenna;
    wherein the first time periods are busy time periods, and the second time periods are idle time periods;
    wherein the idle time periods include time periods configured by the network during which the operating antenna does not need to be used for receiving or transmitting signals.

11. The antenna selection method as claimed in claim 10, further comprising:
    counting a third time period, and when the first third time period is not expired, continuously measuring the first communication quality parameter and the second communication quality parameter; and when the third time period is expired, determining whether to update and swap the setting of the operating antenna and the non-operating antenna according to the measured first communication quality parameter and the measured second communication quality parameter.

12. The antenna selection method as claimed in claim 11, further comprising:

adjusting duration of the third time period according to a current operation state of the communication device or current communication signal quality.

13. The antenna selection method as claimed in claim 11, further comprising:

during the third time period, forcing at least one portion of the first time periods of the operating antenna to be set as the second time period.

14. The antenna selection method as claimed in claim 10, wherein the second time periods include time periods configured by a network in which the operating antenna does not need to be used for receiving or transmitting signals.

15. The antenna selection method as claimed in claim 10, further comprising:

in the first time periods, sampling one or more first sample parameters of the first communication quality parameter of the operating antenna; and in the second time periods, sampling one or more second sample parameters of the second communication quality parameter of the non-operating antenna;

wherein the first communication quality parameter comprises an average value or a standard deviation value of the first sample parameters, and the second communication quality parameter comprises an average value or a standard deviation value of the second sample parameters.

16. The antenna selection method as claimed in claim 10, wherein each of the first communication quality parameter and the second communication quality parameter comprises one or more selected among RSRP (Reference Signal Received Power), RSRQ (Reference Signal Received Quality), transmission power, and path loss.

17. The antenna selection method as claimed in claim 10, further comprising:

comparing the first communication quality parameter with the second communication quality parameter, and determining whether to update and swap the setting of the operating antenna and the non-operating antenna according to a comparison result.

18. The antenna selection method as claimed in claim 17, further comprising:

if the second communication quality parameter is better than the first communication quality parameter, updating and swapping the setting of the operating antenna and the non-operating antenna.

* * * * *